US008038778B2

(12) United States Patent
Chan et al.

(10) Patent No.: US 8,038,778 B2
(45) Date of Patent: Oct. 18, 2011

(54) AIR PURIFICATION APPARATUS

(75) Inventors: Yiu Wai Chan, Hong Kong (HK); Sui Chun Law, Hong Kong (HK)

(73) Assignee: Akos Advanced Technology Ltd., Hong Konk (HK)

( * ) Notice: Subject to any disclaimer, the term of this patent is extended or adjusted under 35 U.S.C. 154(b) by 440 days.

(21) Appl. No.: 12/364,980

(22) Filed: Feb. 3, 2009

(65) Prior Publication Data

US 2009/0136388 A1 May 28, 2009

Related U.S. Application Data

(63) Continuation of application No. PCT/CN2007/002936, filed on Oct. 12, 2007.

(30) Foreign Application Priority Data

Oct. 16, 2006 (CN) .......................... 2006 1 0137408

(51) Int. Cl.
| | |
|---|---|
| A61L 9/00 | (2006.01) |
| F16K 17/00 | (2006.01) |
| G01D 11/26 | (2006.01) |
| A62B 7/08 | (2006.01) |
| B01D 46/30 | (2006.01) |
| B01D 45/12 | (2006.01) |
| B01D 53/02 | (2006.01) |
| B01D 39/00 | (2006.01) |
| B01D 47/16 | (2006.01) |
| B03C 3/00 | (2006.01) |
| B08B 15/02 | (2006.01) |
| G01N 21/00 | (2006.01) |

(52) U.S. Cl. ....... 96/224; 422/3; 422/4; 422/5; 422/427; 422/83; 422/108; 422/114; 422/115; 422/119; 422/122; 422/177; 422/186; 422/186.3; 422/211; 422/900; 95/8; 95/25; 95/78; 95/141; 95/268; 95/270; 95/273; 95/274; 95/276; 95/285; 95/901; 95/902; 96/152; 96/108; 96/413; 96/417; 96/424; 261/96; 261/DIG. 17; 454/63; 73/1.06; 73/28.01

(58) Field of Classification Search .................. 422/3–5, 422/427, 83, 108, 114–115, 119, 122, 177, 422/186, 186.3, 211, 900; 95/8, 25, 78, 141, 95/267–268, 270, 273–274, 276, 285, 901–902; 96/152, 108, 224, 413, 417, 424; 261/96, 261/DIG. 17; 454/63; 73/1.06, 28.01
See application file for complete search history.

(56) References Cited

U.S. PATENT DOCUMENTS

| | | | | |
|---|---|---|---|---|
| 5,935,525 | A  * | 8/1999 | Lincoln et al. | 422/121 |
| 6,500,387 | B1 * | 12/2002 | Bigelow | 422/24 |
| 6,508,982 | B1 * | 1/2003 | Shoji | 422/22 |
| 2004/0007000 | A1 * | 1/2004 | Takeda et al. | 62/78 |

FOREIGN PATENT DOCUMENTS

| | | |
|---|---|---|
| CN | 2515579 | 10/2002 |
| JP | 10-253096 | 9/1998 |
| JP | 2001-61947 A | 3/2001 |

* cited by examiner

Primary Examiner — Jill Warden
Assistant Examiner — Monzer Chorbaji
(74) Attorney, Agent, or Firm — Muncy, Geissler, Olds & Lowe, PLLC

(57) ABSTRACT

An apparatus (10) for purifying polluted air consisting of particle phase pollutants and gaseous phase pollutants, the apparatus (10) comprising: a dust level sensor (23) to measure the amount of particle phase pollutants in the polluted air; a dust removal component (14) to remove the particle phase pollutants from the polluted air; a catalyst filtering core (17) to decompose the gaseous phase pollutants by chemical reaction; a valve (22) for selectively controlling a path of air flow within the apparatus (10) and is movable between an open position and closed position, the valve (22) being positioned downstream from the dust removal component (14); wherein if the amount of particle phase pollutants measured by the dust level sensor (23) is above a predetermined value, the valve (22) is moved to the open position to enable the air to bypass the catalyst filtering core (17); and if the amount of particle phase pollutants measured by the dust level sensor (23) is less than a predetermined value, the valve (22) is moved to the closed position to force the air to pass through the catalyst filtering core (17).

12 Claims, 5 Drawing Sheets

AIR PURIFICATION APPARATUS

This non-provisional application is a continuation of International Application No. PCT/CN2007/002936, which was filed on 12 Oct. 2007, and which claims priority to Chinese Patent Application No. 200610137408.9, which was filed on 16 Oct. 2006, and which are both herein incorporated by reference.

TECHNICAL FIELD

This invention relates to the field of environmental protection. In particular, the invention relates to an intelligent apparatus for air purification.

BACKGROUND OF THE INVENTION

The air pollutants exist in two major physical phases: particle phase pollutants and gaseous phase pollutants. The particle phase pollutants are pollutants with significant physical sizes including dust particles, airborne bacteria and mold. They may be composed and be bound together by different matters with different compositions. The gaseous phase pollutants are pollutants with simple chemical structures. The size of the gaseous phase pollutants are small from angstrom to nano-scale. Odor molecules and volatile organic compounds are examples of gaseous phase pollutants.

To eliminate the particle phase pollutants or pollutants with significant physical sizes, electrostatic precipitator or high efficiency particulate air filter are always employed. The removal efficiency may reach to 80% to 99.9%. However, it is not always easy to remove the gaseous phase pollutants.

Oxidants such as ozone and hydroxyl radicals are generated from an ozone generator or ionizer. They are very good reactants and can decompose the harmful and small molecular matters. Use of oxidants has been widely used for air purification. However, the rate of air purification depends on the concentration of the oxidants. When the ozone and hydroxyl radical are directly released into the air, their concentrations are immediately diluted. On another hand, these oxidants bombard other non-target molecules in the fluid and become decayed. Therefore, they cannot effectively oxidize the pollutants and organic molecules. Consequently, most ionizers cannot effectively purify the air. Only high concentration of ozone can effectively clean the air. To address this problem, some air purifiers use a catalyst for air cleaning. For example, when a photo-catalyst is being irradiated under a UV lamp, oxidants are generated. An oxidation or reduction reaction of the pollutants occurs.

There are also some air purification methods which involve the adsorption of pollutants into the pores of molecular sieves, based on the size, orientation, shape, and hydrophilicity of the molecule of the pollutants. Within the pores of the molecular sieves, chemical reactions are performed and the pollutants are decomposed. In these air purification systems, the two pollutant phases are drawn into the systems at the same time. Particle phase pollutants are first trapped in the particle filter. The gaseous phase pollutants are drawn into the catalyst filtering core where a chemical reaction occurs for decomposing the gaseous phase pollutants. However, even a high efficiency particulate air filter with a very high efficiency cannot remove all particles phase pollutants. In heavy polluted areas, such as a smoking area, the polluted air drawn into the system containing particle filter and catalyst filtering core results in un-filtered particles being deposited on the surface of the catalyst. This blocks the active sites of the catalyst and hinders the catalytic reaction. Consequently, the gaseous phase pollutants cannot be effectively eliminated. The accumulation of the particle phase pollutants on the surface of the catalyst leads to other problems such as becoming an incubation area for the growth of bacteria. Using such air purifiers which contain the contaminated catalyst filtering core may release the originally collected pollutants (for example, bacteria, odor, dust). The filter needs to be frequently replaced. This is environmentally un-friendly as the unwanted contaminated catalyst filtering core creates a secondary pollution problem.

SUMMARY OF THE INVENTION

In a first preferred aspect, there is provided an apparatus for purifying polluted air consisting of particle phase pollutants and gaseous phase pollutants, the apparatus comprising:
  a dust level sensor to measure the amount of particle phase pollutants in the polluted air;
  a dust removal component to remove the particle phase pollutants from the polluted air;
  a catalyst filtering core to decompose the gaseous phase pollutants by chemical reaction;
  a valve for selectively controlling a path of air flow within the apparatus and is movable between an open position and closed position, the valve being positioned downstream from the dust removal component;
  wherein if the amount of particle phase pollutants measured by the dust level sensor is above a predetermined value, the valve is moved to the open position to enable the air to bypass the catalyst filtering core; and
  if the amount of particle phase pollutants measured by the dust level sensor is less than a predetermined value, the valve is moved to the closed position to force the air to pass through the catalyst filtering core.

The apparatus may further comprise a processor to control the movement of the valve from the open position to the closed position in response to the amount of particle phase pollutants measured by the dust level sensor.

The apparatus may further comprise a reactant generator to emit the ozone and generate UV light kill bacteria in the polluted air;

The reactant generator may be deactivated when the valve is in the open position to prevent the leakage of reactant when the catalyst filtering core is not in use.

The apparatus may further comprise an exhaust fan for drawing the polluted air into the apparatus via an air inlet and out through the air outlet The dust removal component may be an electrostatic precipitator or high efficiency particulate air filter to remove dust with a physical size approximately 0.01 µm or larger.

The catalyst filtering core may be a molecular sieve filter or a titanium dioxide filter.

The reactant generator may be a UV sterilizer lamp capable of generating ozone, a reducing agent generator or an oxidant generator.

A high efficiency particulate air filter may be provided above the molecular sieve filter.

The apparatus may further comprise an odor level sensor to measure the concentration of volatile organic compounds in the air, the measurement being provided to the processor to determine the speed of an exhaust fan for drawing the polluted air.

The dust level sensor may calculate the amount of dust collected by the dust removal component, and when the amount of the accumulated dust collected by the dust removal component is higher than a predetermined value, the processor generates an alarm to clean the dust removal component, and the accumulation of the dust collected by the dust removal component is calculated by:

> Total amount of particle phase pollutants collected by the dust removal component=(speed of fan $X$ the operational time of the apparatus $X$ particle phase pollutants in the polluted air)+total amount of particle phase pollutants collected by the dust removal component of a previous operation.

The valve may be manually adjustable by a user.

In the present intelligent air purification system, different phases of pollutants in the air are purified separately at different times for different duration. The larger size particle phase pollutants are firstly treated and until their concentration reaches to a satisfactory level, then the smaller size pollutants and gaseous phase pollutants are treated. The present invention offers an outstanding air purification method, when comparing to the traditional air purification system where the pollutants in the air are forced to pass through the particles filter and gaseous phase filter at one time and leading to the blocking of gaseous filter and decline in its function. The present invention provides a method of air purification which is highly effective, environmentally friendly, and able to reduce the chance of secondary pollutions.

The apparatus for air purification comprises a casing. The casing includes an air inlet and an air outlet. Inside the casing, the following components are equipped:
 (i) Dust cleaning apparatus
 (ii) Valve for controlling the airflow path within the casing
 (iii) Reactant Generator
 (iv) Catalyst filtering core
 (v) Exhaust fan for drawing the air
 (vi) Dust level sensor
 (vii) Central processing unit The distinguishing features of the apparatus are: the dust cleaning apparatus is installed at the upstream position of the reactant generator, the valve and the catalyst filtering core are installed at the downstream position of the reactant generator. The exhaust fan is installed in any position within the apparatus to draw the air to flow from the upstream position to the downstream position. When the said valve is closed, it would become the same level as the catalyst filtering core. The air must flow through the catalyst filtering core, after passing through the dust cleaning apparatus and the reactant generator before flowing out.

When the valve is opened, it would become a resistant-free opening for the air to pass through. The air would then flow through this resistant-free opening instead of the catalyst filtering coreing core, after passing through the dust cleaning apparatus and the reactant generator. As the air pollutant at high dust level do not pass through the catalyst filtering core with higher air resistance, the catalyst filtering core is free from the dust contamination, and the filter lifespan is therefore extended.

The reactant generator must stop operating when the valve is opened to prevent the leakage of reactant when the catalyst filtering core is not in operation. With this design, when the ozone generator is employed as the reactant generator, no ozone would be leaked to the outer environment.

The open and close action of the valve is controlled by the dust level sensor and the central processing unit of the apparatus.

The dust cleaning apparatus shall be able to remove dust with physical sizes above or around 0.01 µm.

The dust cleaning apparatus includes an electrostatic precipitator.

The dust cleaning apparatus includes high efficiency particulate air filter.

If the catalyst filtering core is a molecular sieve filter, the reactant generator is a UV sterilizer lamp which is capable of generating ozone. With this design, the bacteria killing function is enhanced and the ozone generated becomes the oxidant for the reaction in the molecular sieve.

If the catalyst filtering core is a molecular sieve filter, the reactant generator is an oxidant generator. This is because some gaseous phase pollutants can be decomposed only when undergoing the oxidation reaction.

If the catalyst filtering core is a molecular sieve filter, the reactant generator is a reducing agent generator. This is because some gases phase pollutants can be decomposed only when undergoing the reduction reaction.

If the catalyst filtering core is a titanium dioxide filter, the reactant generator is an oxidant generator.

If the catalyst filtering core is a titanium dioxide filter, the reactant generator is a UV sterilizer lamp and irradiates on the surface of the titanium dioxide filter with an effective wavelength. The UV sterilizer will provide strong enough energy for the oxidation reaction of the pollutants on the surface of the titanium dioxide filter.

A high efficiency particulate air filter can be installed on top of the molecular sieve filter. When the valve is closed, all the air is forced to pass through the molecular sieve filter, the high efficiency particulate air filter acts as a final protection for the molecular sieve filter. The UV sterilizer lamp irradiates on the surface of the high efficiency particulate air filter, and prevents any chance of bacteria incubation, on the surface of the high efficiency particulate air filter.

The dust level sensor detects the dust level of the surrounding environment. The data of dust level is then input to the central processing unit. The central processing unit controls the open and close action of the valve. The judgment of the central processing unit is by comparing the dust level obtained with the pre-set value. When the dust level obtained is higher than the pre-set value, it indicates that the dust level of the surroundings is high. The electrostatic precipitator and high efficiency particulate air filter cannot remove all dust particles at a time, which would contaminate the catalyst filtering core. Therefore, it is necessary to open the valve and treat all dust particles first. When the dust level is lower than the pre-set value, it indicates the dust level of the surroundings come to a satisfactory level, the electrostatic precipitator and high efficiency particulate air filter can remove all dust particle at a time. The valve can then be closed and the air purification shall focus on the removal of the gaseous phase pollutants.

The air purification apparatus comprises an odor level sensor connected to the central processing unit. The odor level sensor measures the concentration of the volatile organic compounds in the surroundings. The concentration is then input to the central processing unit for further judgment and control the speed of the exhaust fan. With this design, different levels of gaseous phase pollutants can be treated by the air purification system intelligently.

The dust level sensor measures the concentration of dust of the surroundings for calculating the amount of dust being collected by the electrostatic precipitator. When the amount of the accumulated dust being held is higher than the predetermined value, the central processing unit will give out the alarm and reminds the user to clean the electrostatic precipitator. The accumulation of the dust being collected by the electrostatic precipitator is calculated according to the following equation:

> Total dust being held by the electrostatic precipitator= (Speed of fan $x$ the operation time of the air purification apparatus $x$ the surrounding dust level)+ the total dust being held by the electrostatic precipitator of the last operation.

The dust cleaning apparatus is capable of being taken off from the whole air purification apparatus for cleaning and maintenance purpose.

Owing to different environmental factors, different person has different perception and sensitivity on the levels of pollutants. Some people may be more sensitive toward the dust or odor levels. Therefore, besides employing the dust level sensor and central processing unit to control the open and close action of the valve, users can use his/her own judgment on sensitivity and control the valve manually, instead of using the dust level sensor.

This invention provides an air purification apparatus, the air flow path inside the apparatus is managed by controlling the open and close action of the valve, and to prevent the deposition of dust particle on the surface of the catalyst filtering core which would lead to non-function of the catalyst. The open and close action of valve, is actually based on the air quality assessment by the dust level sensor and the central processing unit. When the dust level of the surrounding air is in an un-satisfactory level, the central processing unit would give instruction to open the valve. The reactant generator will be turned off. This could prevent the leakage of the reactants when the catalyst filtering core is not in operation. When the dust level in air reaches to a satisfactory level, the central processing unit would give instruction to close the valve, and turn on the reactant generator. Reactants are generated and react with the gaseous phase organic pollutants on the surface of the catalyst filtering core. The gaseous phase pollutants would then be decomposed. This invention can help to eliminate the particle phase and gaseous phase pollutants orderly and intelligently. The lifespan of the catalyst filtering core is extended. The secondary pollution will be avoided. A real environment protection purpose is achieved.

DETAILS DESCRIPTION OF THE DRAWINGS

Figure 1:
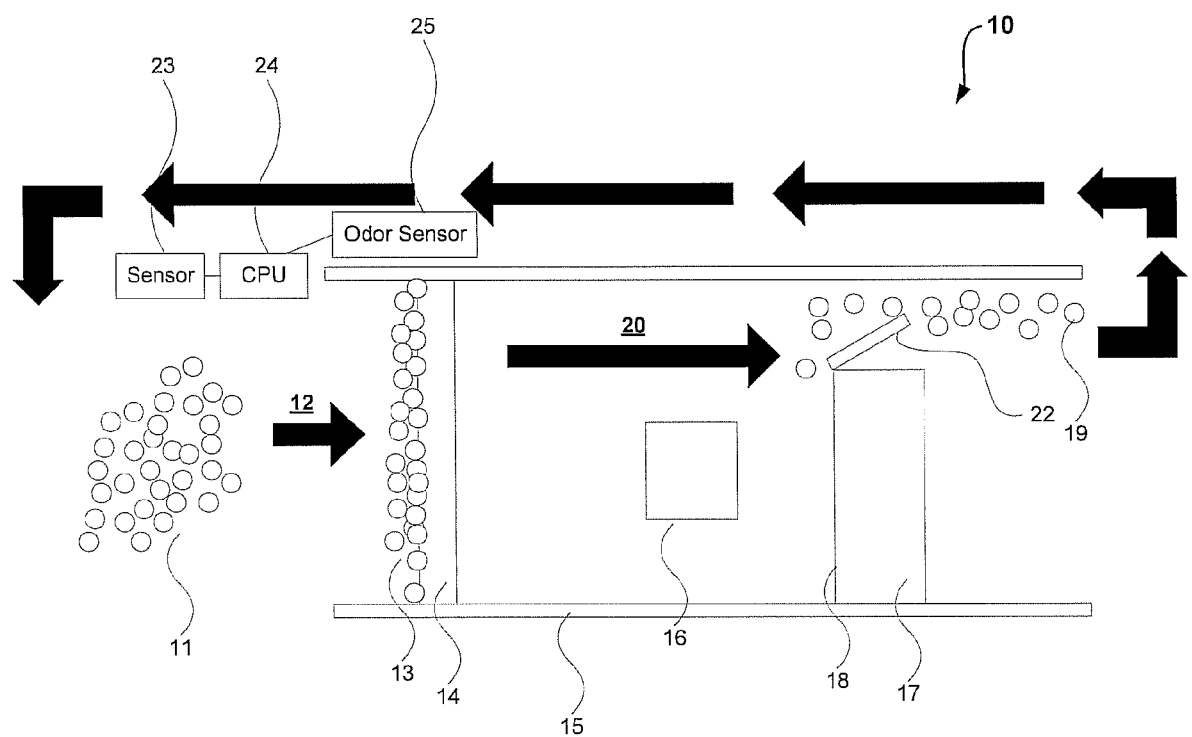
FIG. 1 is a schematic diagram of the present invention with its valve open.

Referring to FIG. 1, schematic diagram an air purification apparatus 10 comprising a casing 15, a dust removal component 14 such as electrostatic precipitator or high efficiency particulate air filter, a valve 22 for controlling the path of airflow within the air purification apparatus, a reactant generator 16 and a catalyst filtering core 17, dust sensor 23 and central processing unit 24. The dust sensor 23 is connected to the central processing unit 24. The central processing unit 24 is connected to the valve 22 and controls its close and open status. The catalyst filtering core 17 is a molecular sieves filter. The reactant generator 16 can be a UV lamp that emits the ozone and generates UV light at wavelength which is suitable for killing the bacteria. High efficiency particulate air filter can be installed at the upstream position of the catalyst filtering core 17. The UV lamp 16 then irradiates the surface of the high efficiency particulate air filter 14 and prevents the bacteria from being incubated on the dust surface of the filter 14. When titanium dioxide is used as the catalyst filtering core 17, the reactant generator 16 can be an oxidant generator or a UV lamp to emit UV light at effective wavelength for irradiating on the surface of the titanium dioxide 17.

The exhaust fan can be placed at any position within the apparatus and it draws the air to flow from the upstream position 12 to the downstream position 13. The bigger dust particulates 11 are already removed 13 when the air passes through the electrostatic precipitator or the high efficiency particulate air filter 14. The remaining dust particulates at smaller size pass through the reactant generator 16 and are exhausted from the apparatus 10 when the valve 22 is open and the leave 19 the apparatus 10. They are not deposited on the leading surface 18 of the catalyst filtering core 17. The catalyst filtering core 17 is therefore not contaminated and does not become non-functioning. When the surrounding dust level is high, the valve 22 opens and allows the air to bypass the catalyst filtering core 17. This protects and extends the operational life of the catalyst filtering core 17.

Figure 2:
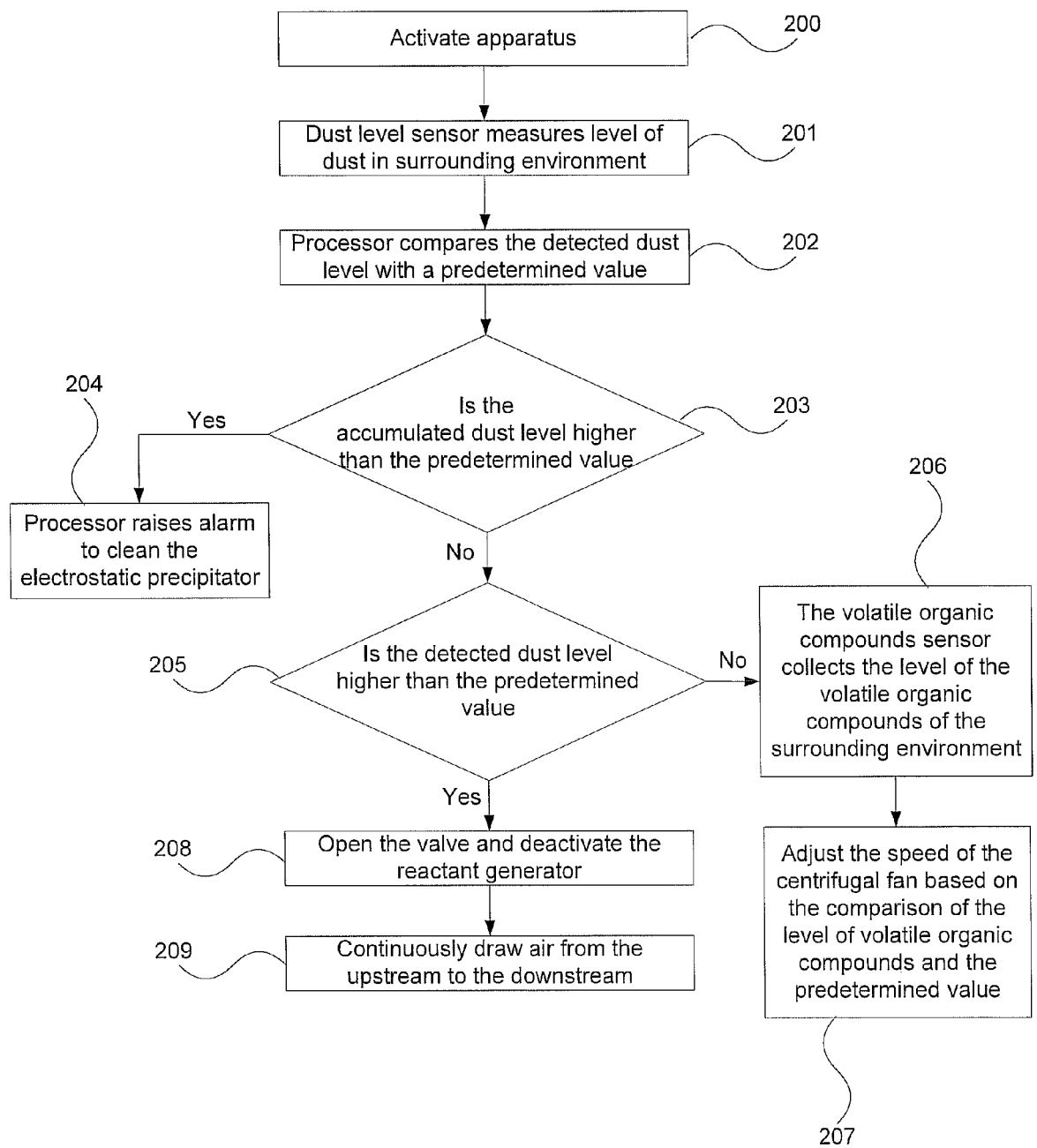
FIG. 2 is a flowchart of the present invention about the procedure of controlling the valve by the central processing unit.

Referring to FIG. 2, an operational procedure of a valve 22 by the central processing unit 24 of the apparatus 10 is shown. The dust level of the surrounding environment is measured by the dust sensor 23 for calculating 203 the amount of the collectable dust by the electrostatic precipitator. 14 When the amount of dust collected and accumulated by the electrostatic precipitator 14 has reached to a pre-determined value, the central processing unit 24 generates 204 an alarm to warn the user to clean the electrostatic precipitator. The dust removal component 14 is capable of being removed from the apparatus 10 for cleaning and maintenance purposes. The central processing unit 24 also compares 205 the dust level of the surrounding environment with another predetermined value. When the dust level is higher than the predetermined value, the valve 22 is opened 208 and the reactant generator 16 is deactivated. The air is drawn 209 continuously from the upstream position to the downstream position until the dust level of the surrounding environment has reached a satisfactory level. Then, a sensor of volatile organic compounds, for example, an odor level sensor 25 collects 206 the level of volatile organic compounds of the surrounding air. Based on the level of the volatile organic compounds, the reaction time for their breaking down is estimated and the speed of the exhaust fan within the air purification apparatus is adjusted 207 accordingly. Thus, the apparatus 10 intelligently cleans the air according the levels of the pollutants.

Figure 3:
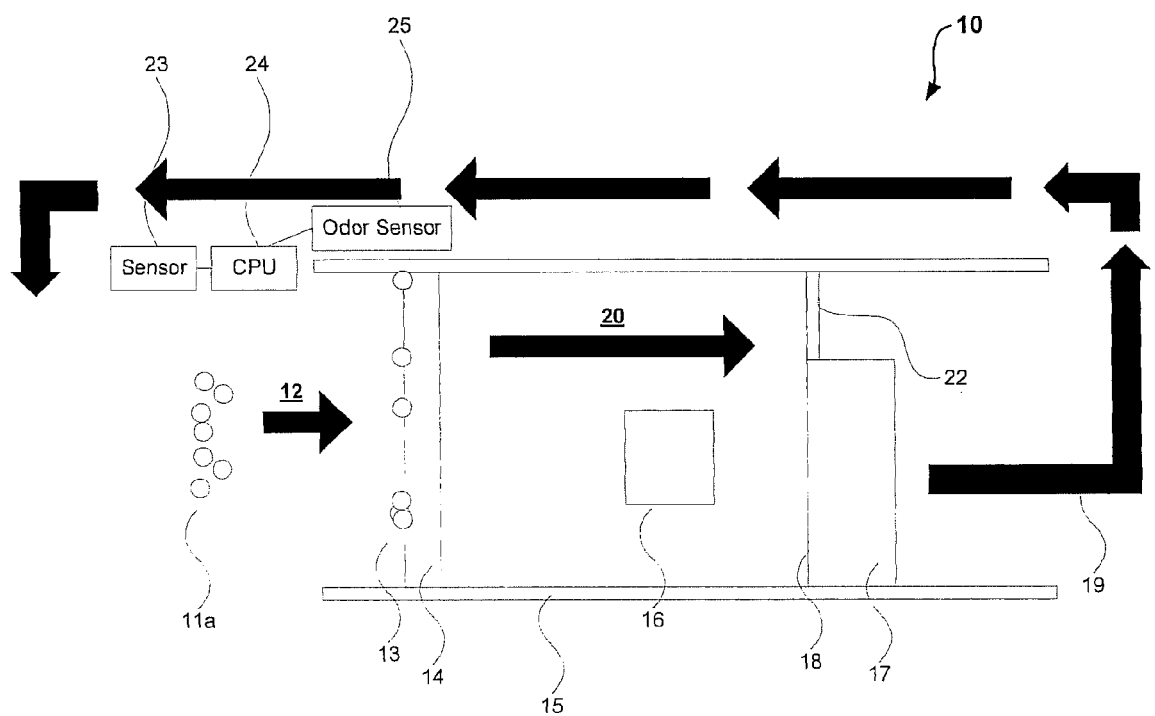
FIG. 3 is a schematic diagram of the present invention with its valve closed.

Referring to FIG. 3, a schematic diagram of the present invention with the valve 22 closed is depicted. When the dust level of the surrounding environment is detected to be of a satisfactory level 11a by the dust sensor 23, the central processing unit 24 instructs the valve 22 to close. When closed, the valve 22 is moved to the same level as the catalyst filtering core 17 to obstruct the air flow path causing the air flow to divert and pass only through the catalyst filtering core 17. The reactant generator 16 is then activated. After passing through the electrostatic precipitator 14 and the reactant generator 16, the air is now forced to pass through the catalyst filtering core 17 because the air pathway via the valve 22 is now closed. The reactant generated and the gaseous phase pollutants are adsorbed into the catalyst filtering core 17 for the decomposition reactions of gaseous phase pollutants to occur.

Figure 4:
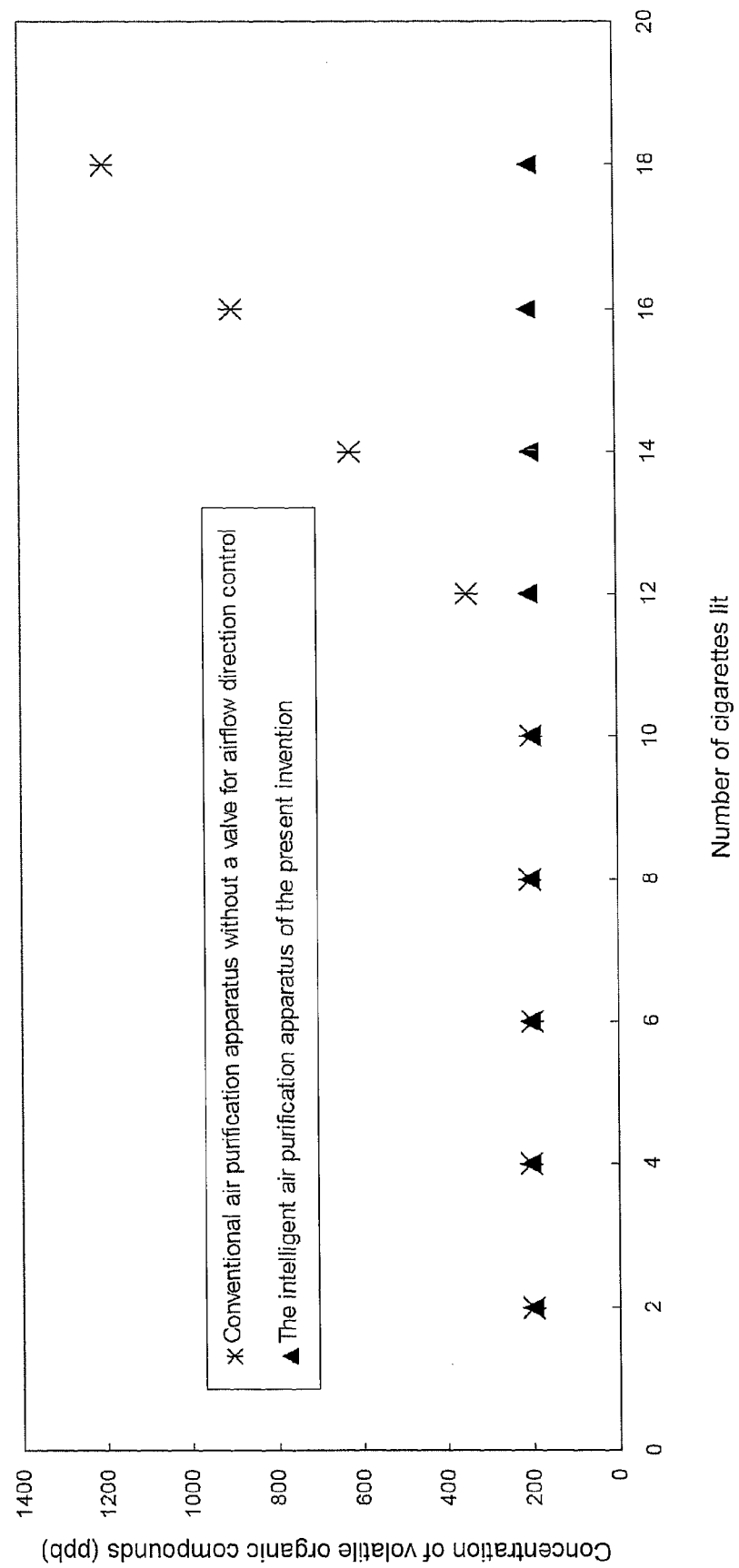
FIG. 4 is a chart comparing the performance of air purification by the apparatus of the present invention and a prior art air purification system.

Referring to FIG. 4, a chart comparing the performance of air purification by the apparatus 10 of the present invention and that of a prior art system is illustrated. Testing was carried out in a smoking room having a 200 square feet size, with a head room height of 3 meters. When the prior art apparatus was used in the testing, the removal performance of volatile organic compounds by the air purification apparatus became ineffective when the tenth cigarette was lit. The pollutants accumulated in the filter were also released from the apparatus to the environment. Consequently, the pollutant level of the environment actually increased. In contrast, when the apparatus 10 of the present invention was used, the pollutants were treated effectively and orderly. The catalyst filtering core 17 for treating the gaseous phase pollutants was not contaminated and did not become non-functional. Therefore, the air purification apparatus 10 is able to treat the pollutants for prolonged duration and effectively filter the air.

Figure 5:
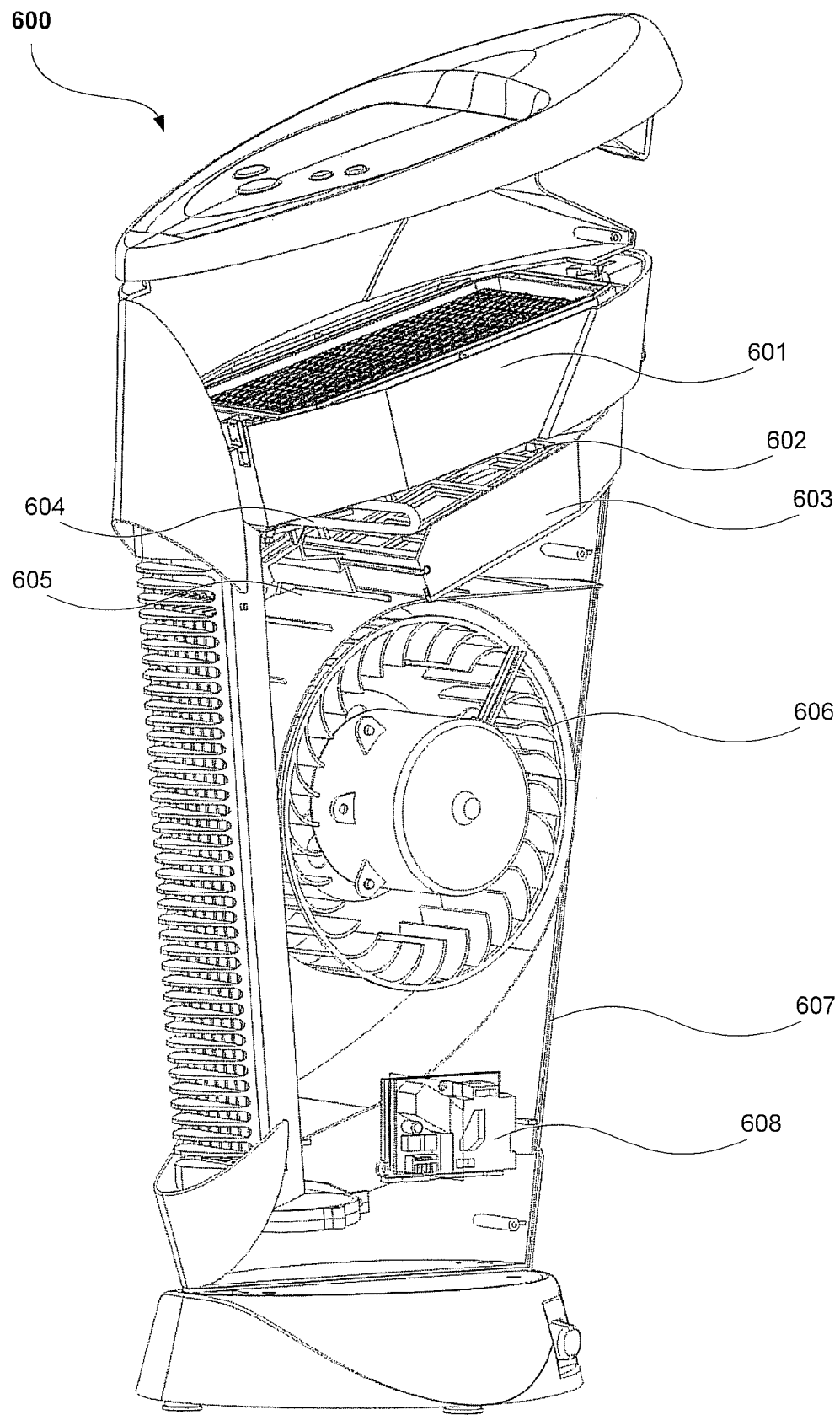
FIG. 5 is a perspective view of the present invention showing the internal structure according to a third embodiment.

Referring to FIG. 5, a diagram of an embodiment of the present invention showing the internal structure of the apparatus 600 is illustrated. The apparatus 600 comprises a casing 607, an exhaust fan 606 and an electrostatic precipitator 601. The apparatus 600 also comprises a UV lamp 604 which is capable of emitting ozone and generating UV light at wavelength which is effective for killing the bacteria. The UV lamp 604 functions as a reactant generator. A closely and tightly packed molecular sieves filter 603 is the catalyst filtering core. Above the catalyst filtering core 603, a high efficiency particulate air filter 602 is installed. The UV lamp 604 is orientated such that it irradiates on the surface of the high efficiency particulate air filter 602 to increase the bacteria killing effect. The valve 605 is positioned at the same level as the catalyst filtering core 603. When the dust level is high, the valve 605 is opened. The air does not pass through the catalyst filtering core 603 and flow out via the void opened by the valve 605. However, when the dust level is low, the valve 605 is closed such that air is forced through the catalyst filtering core 603 to purify the air. This enables the air purification apparatus 600 treats the high-level particle phase pollutant in a higher priority manner.

We claim:

1. An apparatus for purifying polluted air consisting of particle phase pollutants and gaseous phase pollutants, the apparatus comprising:
    a dust level sensor to measure the amount of particle phase pollutants in the polluted air;
    a dust removal component to remove the particle phase pollutants from the polluted air;
    a catalyst filtering core to decompose the gaseous phase pollutants by chemical reaction;
    a valve for selectively controlling a path of air flow within the apparatus and is movable between an open position and closed position, the valve being positioned downstream from the dust removal component;
    wherein if the amount of particle phase pollutants measured by the dust level sensor is above a predetermined value, the valve is moved to the open position to enable the air to bypass the catalyst filtering core; and
    if the amount of particle phase pollutants measured by the dust level sensor is less than a predetermined value, the valve is moved to the closed position to force the air to pass through the catalyst filtering core.

2. The apparatus according to claim 1, further comprising a processor to control the movement of the valve from the open position to the closed position in response to the amount of particle phase pollutants measured by the dust level sensor.

3. The apparatus according to claim 2, further comprising an odor level sensor to measure the concentration of volatile organic compounds in the air, the measurement being provided to the processor to determine the speed of an exhaust fan for drawing the polluted air.

4. The apparatus according to claim 2, wherein the dust level sensor calculates the amount of dust collected by the dust removal component, and when the amount of the accumulated dust collected by the dust removal component is higher than a predetermined value, the processor generates an alarm to clean the dust removal component, and the accumulation of the dust collected by the dust removal component is calculated by:

Total amount of particle phase pollutants collected by the dust removal component=(speed of fan $X$ the operational time of the apparatus $X$ particle phase pollutants in the polluted air)+total amount of particle phase pollutants collected by the dust removal component of a previous operation.

5. The apparatus according to claim 1, further comprising a reactant generator to emit the ozone and generate UV light kill bacteria in the polluted air.

6. The apparatus according to claim 5, wherein the reactant generator is deactivated when the valve is in the open position to prevent the leakage of reactant when the catalyst filtering core is not in use.

7. The apparatus according to claim 5, the reactant generator is a UV sterilizer lamp capable of generating ozone, a reducing agent generator or an oxidant generator.

8. The apparatus according to claim 1, further comprising an exhaust fan for drawing the polluted air into the apparatus via an air inlet and out through the air outlet.

9. The apparatus according to claim 1, wherein the dust removal component is an electrostatic precipitator or high efficiency particulate air filter to remove dust with a physical size approximately 0.01 μm or larger.

10. The apparatus according to claim 1, wherein the catalyst filtering core is a molecular sieve filter or a titanium dioxide filter.

11. The apparatus according to claim 10, wherein a high efficiency particulate air filter is provided above the molecular sieve filter.

12. The apparatus according to claim 1, wherein the valve is manually adjustable by a user.

* * * * *

UNITED STATES PATENT AND TRADEMARK OFFICE
CERTIFICATE OF CORRECTION

| | | |
|---|---|---|
| PATENT NO. | : 8,038,778 B2 | Page 1 of 1 |
| APPLICATION NO. | : 12/364980 | |
| DATED | : October 18, 2011 | |
| INVENTOR(S) | : Chan et al. | |

It is certified that error appears in the above-identified patent and that said Letters Patent is hereby corrected as shown below:

On the Title Page:

Item (73) Assignee:

Change from:

(73) Assignee: Akos Advanced Technology Ltd., Hong Konk (HK)

To:

(73) Assignee: Akos Advanced Technology Ltd., Hong Kong (HK)

Signed and Sealed this
Twenty-ninth Day of November, 2011

David J. Kappos
*Director of the United States Patent and Trademark Office*